US010141851B2

(12) United States Patent
Raju (10) Patent No.: US 10,141,851 B2
(45) Date of Patent: Nov. 27, 2018

(54) RESONANT DC TO DC POWER CONVERTER

(71) Applicant: GENERAL ELECTRIC COMPANY, Schenectady, NY (US)

(72) Inventor: Ravisekhar Nadimpalli Raju, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 43 days.

(21) Appl. No.: 15/081,339

(22) Filed: Mar. 25, 2016

(65) Prior Publication Data
US 2017/0279361 A1 Sep. 28, 2017

(51) Int. Cl.
*H02M 7/48* (2007.01)
*H02M 3/335* (2006.01)
(Continued)

(52) U.S. Cl.
CPC ......... *H02M 3/33507* (2013.01); *H02M 1/12* (2013.01); *H02M 3/3376* (2013.01);
(Continued)

(58) Field of Classification Search
CPC . H02M 2007/4818; H02M 2007/4815; H02M 7/08; H02M 7/10; H02M 7/064; H02M 7/06; H02M 3/26; H02M 3/28; H02M 3/315; H02M 3/325; H02M 3/335; H02M 3/338; H02M 3/33569
(Continued)

(56) References Cited

U.S. PATENT DOCUMENTS 5,157,592 A 10/1992 Walters
5,198,969 A 3/1993 Redl et al.
(Continued)

OTHER PUBLICATIONS

Hamada S et al., "Saturable reactor assisted soft-switching full-bridge DC-DC power convertors", IEE Proceedings B (Electric Power Applications), vol. 138, Issue: 2, pp. 95-103, Mar. 1991.
(Continued)

*Primary Examiner* — Timothy J Dole
*Assistant Examiner* — Bryan R Perez
(74) *Attorney, Agent, or Firm* — GE Global Patent Operation; Nitin Joshi (57) ABSTRACT

A direct current (DC) to DC power converter includes a first converter for converting a first DC bus voltage into a first high frequency AC voltage and a second converter for converting a second high frequency alternating current (AC) voltage into a second DC bus voltage. The DC to DC converter also includes a resonant circuit for coupling the first bus converter and the second bus converter and a controller for providing switching signals to the first converter and the second converter to operate the power converter in a soft switching mode. The resonant circuit includes a high frequency transformer coupled between the first converter and the second converter and an auxiliary converter coupled in series with a first resonant inductor and the high frequency transformer. The resonant circuit further includes second inductor coupled across a first winding of the high frequency transformer. An auxiliary voltage generated by auxiliary converter is added in series with an output voltage of the first converter.

25 Claims, 7 Drawing Sheets

(51) Int. Cl.
  *H02M 1/12* (2006.01)
  *H02M 3/337* (2006.01)
  *H02M 1/00* (2006.01)

(52) U.S. Cl.
  CPC ............. *H02M 2001/0058* (2013.01); *H02M 2007/4811* (2013.01); *H02M 2007/4818* (2013.01); *Y02B 70/1433* (2013.01); *Y02B 70/1491* (2013.01)

(58) Field of Classification Search
  USPC ............. 363/21.02, 21.03, 15–17, 71, 97–98
  See application file for complete search history.

(56) References Cited

U.S. PATENT DOCUMENTS

| | | | |
|---|---|---|---|
| 5,539,630 A | 7/1996 | Pietkiewicz et al. | |
| 7,136,294 B2 | 11/2006 | Phadke et al. | |
| 7,209,370 B2 | 4/2007 | Phadke et al. | |
| 7,869,237 B1 | 1/2011 | Schutten et al. | |
| 7,952,892 B2 | 5/2011 | Orr | |
| 2010/0208499 A1* | 8/2010 | Halberstadt | H02M 3/3376 363/21.1 |
| 2011/0103098 A1* | 5/2011 | Wu | H02M 1/36 363/17 |
| 2011/0235384 A1* | 9/2011 | Mabuchi | H02M 7/49 363/132 |
| 2012/0037616 A1* | 2/2012 | Kitahara | H02M 7/53871 219/665 |
| 2012/0092898 A1* | 4/2012 | Raju | H02M 3/33561 363/17 |
| 2012/0092915 A1* | 4/2012 | Okuda | H02M 7/487 363/132 |
| 2012/0153729 A1* | 6/2012 | Song | H02J 7/0013 307/82 |
| 2014/0021489 A1* | 1/2014 | Hamada | H01L 21/046 257/77 |

OTHER PUBLICATIONS

Wei Chen et al., "Snubberless Bidirectional DC-DC Converter With New CLLC Resonant Tank Featuring Minimized Switching Loss", Industrial Electronics, IEEE Transactions on, vol. 57, Issue: 9, pp. 3075-3086, Sep. 2010.

Abel-Rahman, S., "Resonant LLC Converter: Operation and Design," Infineon Technologies North America (IFNA) Corp., Application Note AN Sep. 2012, V 1.0, pp. 1-19,Sep. 2012.

Hesterman, B., "Wide Range Mjlti-Phase Resonant Converters," Colorado Power Electronics, Inc. pp. 1-14, 2010.

\* cited by examiner

RESONANT DC TO DC POWER CONVERTER

BACKGROUND

Embodiments of the invention relate generally to power converters and more specifically to series resonant direct current (DC) to DC power converters.

DC to DC power converters are very prevalent in today's power systems. There are many applications of DC to DC converters, e.g., power supplies for cell phones, laptops, X-ray machines and telecommunications equipment. DC to DC converters are also used in hybrid electric vehicles or military/civil aircrafts and high voltage DC (HVDC) systems. Further, DC to DC converters may be used in photovoltaic systems for maximum power point tracking.

DC to DC converters are generally operated at a high switching frequency resulting in high switching losses. Further, in high power applications, the switching losses are even more significant because of high voltages and high currents involved therein. In one embodiment, resonant DC to DC converters are used to reduce the switching losses. Resonant converters employ switching of the converter devices at about zero voltage or zero current and thus, the switching losses are reduced. In one embodiment, resonant converters employ series capacitors to obtain the near zero voltage or zero current switching. These series capacitors in resonant converters need to handle high currents since they are in the main power flow path. Series capacitors rated for high ripple currents can be expensive and sizeable. In addition to this, the high ripple current combined with equivalent series resistances (ESR) of these capacitors result in high resistive ($I^2R$) losses. Therefore, the efficiency and reliability of resonant power converters is affected.

Therefore, it is desirable to provide a system and a method that will address the foregoing issues.

BRIEF DESCRIPTION

In accordance with an embodiment of the present technique, a direct current (DC) to DC power converter is provided. The DC to DC power converter includes a first converter for converting a first DC bus voltage into a first high frequency alternating current (AC) voltage and a second converter for converting a second high frequency AC voltage into a second DC bus voltage. The DC to DC converter further includes a resonant circuit for coupling the first converter and the second converter. The resonant circuit includes a high frequency transformer coupled between the first converter and the second converter and an auxiliary converter coupled in series with a resonant inductor and the high frequency transformer. The resonant inductor can be constituted in part or whole by the leakage inductance of the transformer. An auxiliary voltage generated by the auxiliary converter is added in series with an output voltage of the first converter. The resonant circuit also includes a second inductor coupled across a first winding of the high frequency transformer. This second inductor can be constituted by the magnetizing inductance of the transformer. Further, the DC to DC converter includes a controller for providing switching signals to the first converter, the second converter and the auxiliary converter to operate the power converter in a soft switching mode.

In accordance with another embodiment of the present technique, a method of transmitting DC power from a first DC bus to a second DC bus is provided. The method includes providing a first converter for converting a first DC bus voltage into a first high frequency alternating current (AC) voltage and providing a second converter for converting a second high frequency AC voltage into a second DC bus voltage. The method also includes coupling a resonant circuit to the first converter and the second converter for converting the first high frequency AC voltage into a second high frequency AC voltage. The resonant circuit includes a high frequency transformer coupled between the first converter and the second converter and an auxiliary converter coupled in series with a first resonant inductor and the high frequency transformer. An auxiliary voltage generated by the auxiliary converter is added in series with an output voltage of the first converter. The resonant circuit also includes a second inductor coupled across a first winding of the high frequency transformer. Further, the method includes controlling the auxiliary converter to generate soft switching waveforms for switching devices of the first converter and the second converter. It should be noted that the resonant converter described here does not use an LC resonance, per se, but uses the auxiliary converter instead of a capacitor, in conjunction with the resonant inductor.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings. The connections may include direct connections. Furthermore, the terms "circuit" and "circuitry" and "controller" may include either a single component or a plurality of components, which are either active and/or passive and are connected or otherwise coupled together to provide the described function.

Figure 1:
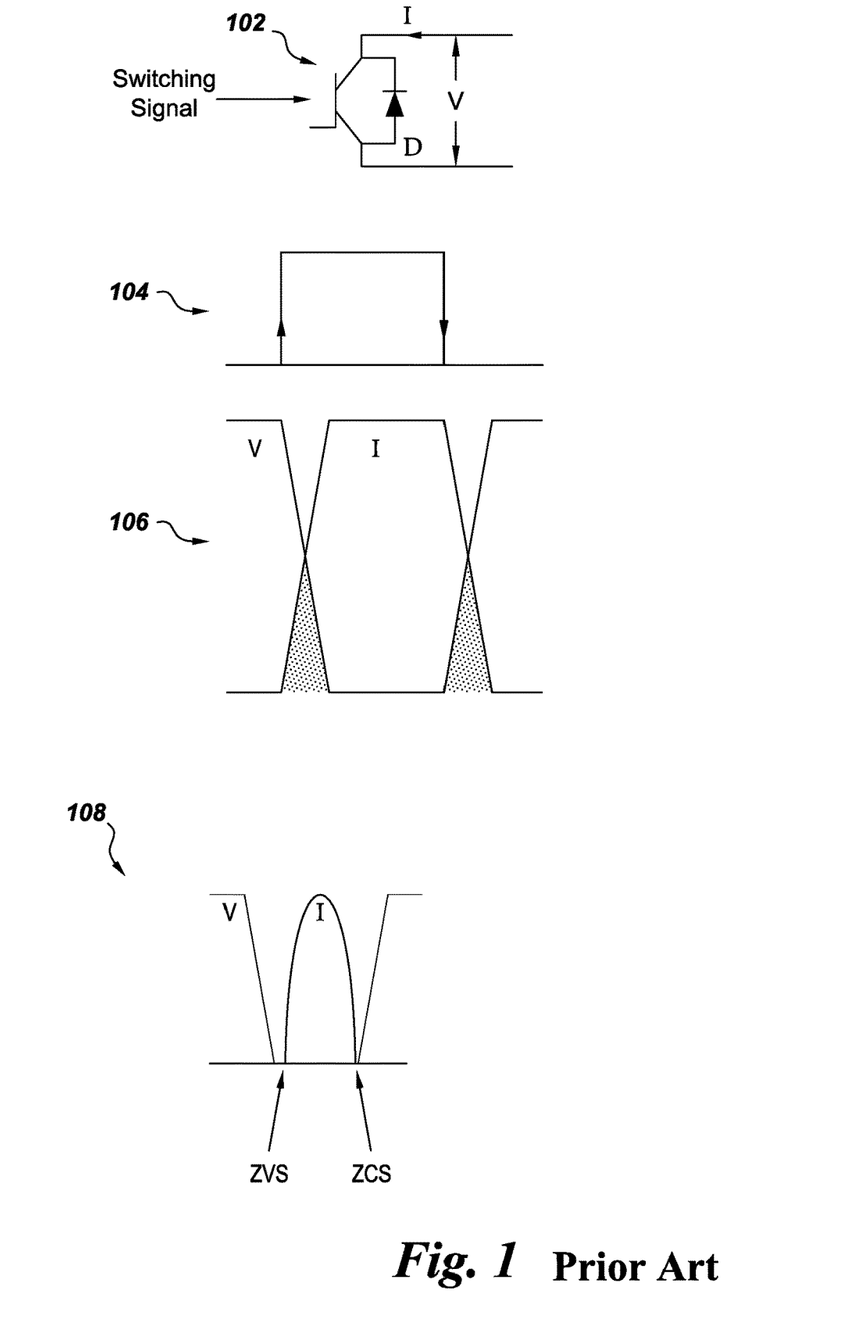
FIG. 1 is a diagrammatical representation of switching waveforms of a switching device used in a DC to DC converter.

FIG. 1 shows switching waveforms of a switching device which illustrates a basic soft switching operation in a DC to DC converter. A switching device 102 shown in FIG. 1 may be a part of a DC to DC converter and is turned on when its switching signal (i.e., a gate drive signal) is made high. In the embodiment shown, when the switching device 102 is turned off, the voltage across it is V and the current in it is zero. Furthermore, when the switching device 102 is turned on, the current in it is I and the voltage across it is zero. A graphical plot 104 is shown for one such switching signal for switching device 102. Further, a graphical plot 106 illustrates current I and voltage V switching waveforms for the switching device 102 when hard switching is employed and a graphical plot 108 illustrates similar switching waveforms when soft switching is employed.

When the switching signal 104 is made high, switching device 102 starts to turn on based on the device characteristics. As the switching device 102 starts turning on, the voltage V across it starts becoming zero as shown in plots 106 and 108. In case of hard switching, the current also immediately starts flowing through switch 102 and thus, plot 106 shows current switching waveform going up while voltage switching waveform going down. Once the switching device 102 is fully turned on, the current (I) becomes high and the voltage (V) becomes low. During this transition, as the current I and voltage waveform V overlap there is switching loss (VI) in switching device 102. This switching loss is shown in plot 106 by a shaded portion.

In case of soft switching, as shown in plot 108, when the switching signal 104 becomes high, the current I may not be positive immediately rather because of the resonance circuit, the current rise may be delayed for a while. The current I may also be negative for a while to start with. This is due to the antiparallel diode D getting conducted in the previous switching step. As compared to plot 106, there is no positive switching loss VI of switching device 102 in plot 108. The reason for that is when the voltage starts reducing, the current is still not positive and so the overlapping period between positive current I and voltage V waveforms in case of soft switching is not there. This is called as zero voltage switching (ZVS) as the current I starts rising and becomes positive only after voltage V is about zero.

When the switching device 102 needs to be turned off, the switching signal is lowered. In case of hard switching as in plot 406 the current (I) then starts reducing immediately and the voltage V starts rising immediately. On the other hand in case of soft switching, as in plot 108, the current I decrease starts before the voltage V starts rising. This is called as zero current switching (ZCS) as the voltage starts rising after the current has been reduced to about zero value. It should be noted that soft switching waveforms 108 shown in FIG. 1 are example waveforms and generally, achieving the perfect waveforms is a difficult task. In many cases, either only ZCS is employed or only ZVS is employed. Further, to obtain this ZCS or ZVS switching a resonant circuit is employed in the DC to DC converter.

Figure 2:
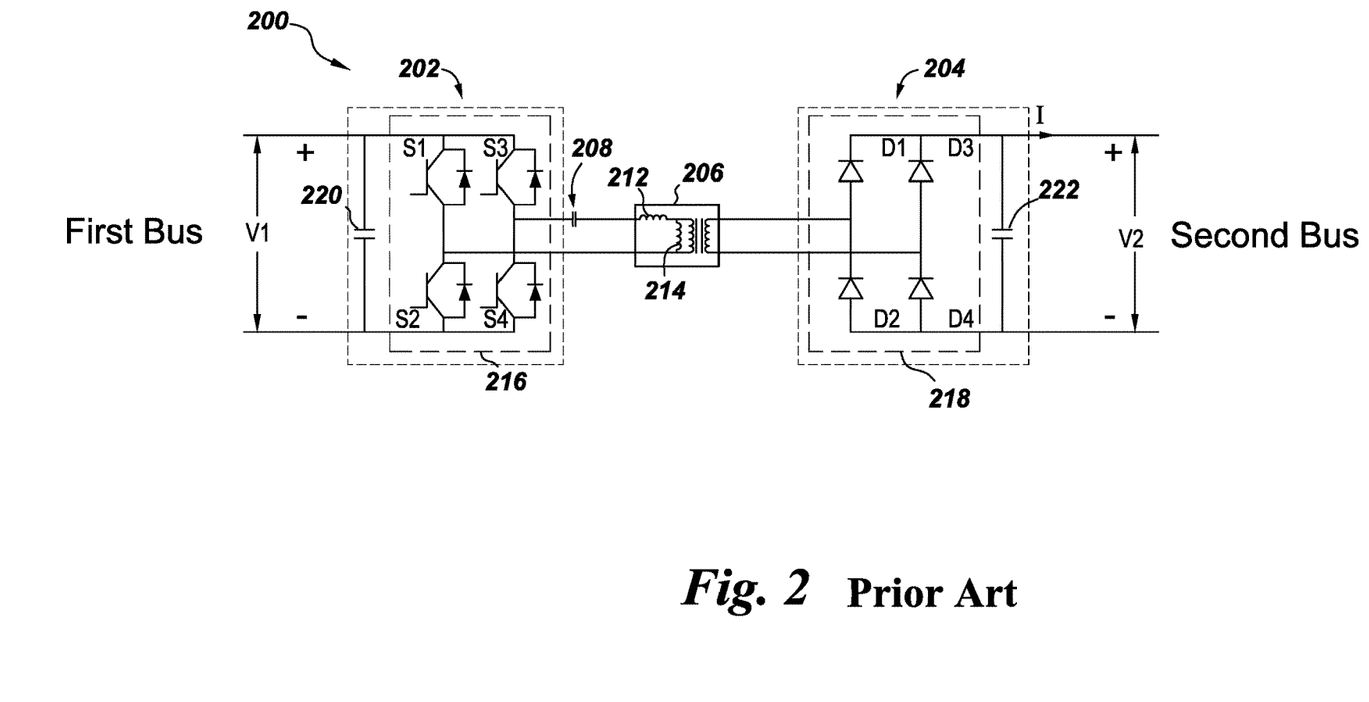
FIG. 2 is a schematic representation of a resonant DC to DC converter.

FIG. 2 shows a schematic representation of a resonant DC to DC converter 200. DC to DC converter 200 is a resonant LLC converter, where resonant LLC refers to a resonant circuit formed by a series connection of one inductor L and one capacitor C, in parallel with another inductor L. Conventional non-resonant DC to DC converters utilize a hard switching technique as explained above and therefore they have high switching losses. As compared to these conventional non-resonant converters, the resonant LLC bridge converter utilize a soft switching technique i.e., the switching devices in resonant LLC dual bridge converter switch at close to zero voltage or zero current because of the resonant circuit formed by inductor and capacitor components. In other words, when switching devices are turning ON or turning OFF, the LLC resonant circuit of the DC to DC converter 200 creates an oscillating voltage or current waveform. Thus, the devices can then turn ON or OFF at a low voltage or a low current (because of slow rise of oscillating voltage/current waveforms) instead of the high voltage or the high current (because of sharp rise of voltage/current in square waveforms) in conventional non-resonant converters.

In the embodiment shown, DC to DC converter 200 is connected between a first bus and a second bus and includes a DC to high frequency AC conversion stage followed by a high frequency AC to DC conversion stage. Specifically, DC to DC converter 200 includes a first converter 202 and a second converter 204. First converter 202 and second converter 204 are coupled to each other via a high or medium frequency transformer 206, a resonant capacitor 208 and resonant inductors 212 and 214 that can be formed by the leakage and magnetizing inductances of the transformer. First converter 202 includes a full bridge converter 216 and a DC bus capacitor 220. Further, second converter 204 includes diode bridge converter 218 and a DC bus capacitor 222. Full bridge converter 216 includes a plurality of switching devices S1, S2, S3 and S4. Similarly, diode bridge converter 218 includes a plurality of diodes D1, D2, D3 and D4.

The resonant capacitor 208 is connected in series with a first resonant inductor 212. Further, a second resonant inductor 214 is connected in parallel to a first winding of the transformer 206. The first winding of the transformer receives a first high frequency AC voltage from first converter 202. The second winding of the transformer provides a second high frequency AC voltage to the second converter 204. The second high frequency AC voltage is determined by transformer turns ratio and the first high frequency AC voltage. When the switching devices are switched ON or OFF, a resonant circuit formed by inductors and capacitors produce oscillating current through the switching devices and thus soft switching can be achieved.

From FIG. 2 it can be seen that the resonant capacitor 208 is in series with transformer 206 and therefore carries a full load current of converter 200 which is generally of a high magnitude. Further, because of the converter switching, the current in capacitor 208 is a ripple current at the switching frequency. Thus, the resonant capacitor 208 needs to be rated for high ripple current. Further, the resonant capacitor 208 also needs to have tight tolerance value (e.g., below 5%). This is required because if there is a high tolerance value capacitor then the capacitance value may vary significantly which will make it difficult to operate the converter 200 at or near the resonance frequency and thus, soft switching may not be achieved. Such special resonant capacitors are expensive and also sizeable. Further, power losses ($I^2R$) in an equivalent series resistance (ESR) of resonant capacitor 208 are significantly high due to the high ripple current. Overall this reduces reliability and efficiency of power converter 200.

It should be noted that the resonant capacitor 208 of DC to DC converter 200 provides a phase shift to an output voltage of first converter 202. In other words, if the voltage across capacitor 208 is V3 and output voltage of first converter 202 is Vc, then the voltage provided at input terminal of transformer 206 would be phasor summation of Vc and V3 i.e., Vc+V3. In accordance with an embodiment of the present technique, the resonant capacitor 208 is replaced with an auxiliary converter which provides an auxiliary voltage which is then added with the output voltage of the first converter 202 and provides a soft switching.

Figure 3:
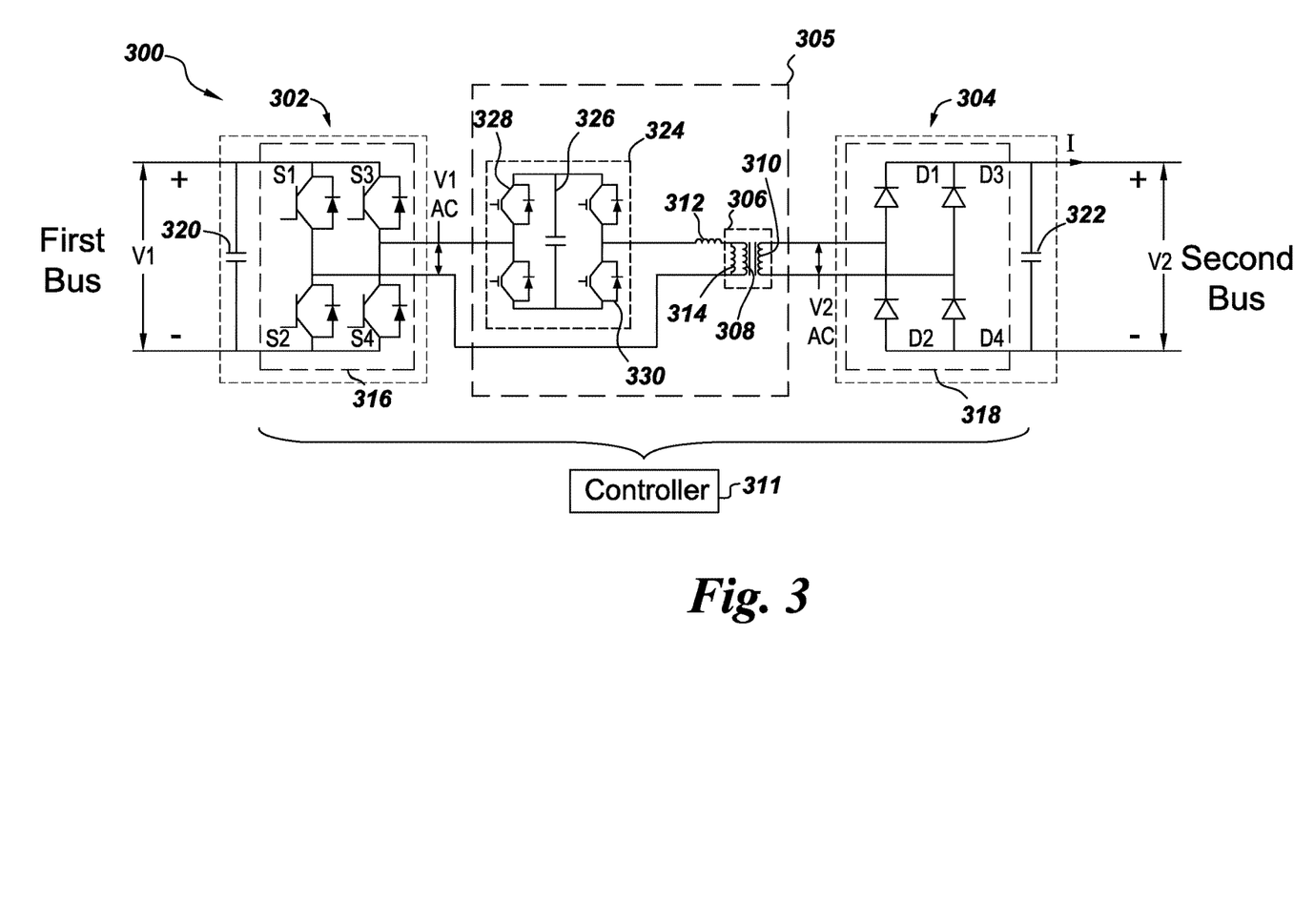
FIG. 3 is a schematic representation of a resonant DC to DC power converter, according to aspects of the present disclosure.

FIG. 3 shows a schematic representation of a DC to DC power converter 300 in accordance with an embodiment of the present technique. DC to DC power converter 300 includes a first converter 302 and a second converter 304. First converter 302 is coupled to a first bus and converts a first DC bus voltage V1 into a first high frequency alternating current (AC) voltage V1ac. Further, second converter 304 is coupled to a second bus and converts a second high frequency AC voltage V2ac into a second DC bus voltage V2. In one embodiment, the first high frequency AC voltage V1 ac and second high frequency AC voltage V2ac include single phase voltages. Further, the second high frequency AC voltage V2ac is determined by a turns ratio of transformer 306 and the first high frequency AC voltage V1ac.

First converter 302 includes a full bridge converter 316 and a DC bus capacitor 320. Further, second converter 304 includes diode bridge converter 318 and a DC bus capacitor 322. Full bridge converter 316 includes a plurality of switching devices S1, S2, S3 and S4. Similarly, diode bridge converter 318 includes a plurality of diodes D1, D2, D3 and D4. The switching devices may include any controllable semiconductor switches such as an Insulated Gate Bipolar Transistor (IGBT), a metal oxide semiconductor field effect transistor, a field effect transistor, a gate turn-off thyristor, an insulated gate commutated thyristor, an injection enhanced gate transistor, or combinations thereof. Further, the switching devices may include silicon carbide based switches, gallium nitride based switches or gallium arsenide based switches.

The DC to DC power converter 300 further includes a resonant circuit 305 for coupling the first converter 302 and the second converter 304. The resonant circuit 305 produces oscillating waveforms so that the converters 300 and 304 can be operated in soft switching mode. Resonant circuit 305 includes a high frequency transformer 306 coupled between the first converter 302 and the second converter 304. Resonant circuit 305 further includes a first resonant inductor 312 which is connected in series with an auxiliary converter 324. The terminals of a series connection formed by the auxiliary converter 324 and the first resonant inductor 312 are connected between one output terminal of the first converter 302 and one AC input terminal of the high frequency transformer 324. The auxiliary converter 324 is controlled to act functionally like a resonant capacitor and produces an auxiliary voltage Vaux which is added with the output voltage V1ac of the first converter 302. Resonant circuit 305 also includes a second resonant inductor 314 which is coupled across a first winding 308 of the high frequency transformer 306. It should be noted that the resonant inductors 312 and 314 may be part of the transformer 306 itself. For example, inductor 312 may represent leakage inductance of transformer 306 and inductor 314 may represent magnetizing inductance of the transformer 306.

DC to DC power converter 300 also includes a controller 311 which provides switching signals to the first converter 302, the second converter 304 and the auxiliary converter 324 to operate the power converter 300 in a soft switching mode. Further, the auxiliary converter includes a capacitor 326 connected in parallel with at least two legs 328 and 330 which are further connected in parallel. Each of the legs includes at least two switching devices connected in series. The switching devices of the auxiliary converter 324 may include silicon carbide devices. The mid-point of the series connection of the two switching devices leg 328 provides one output terminal of the auxiliary converter. Similarly, the mid-point of the series connection of the two switching devices of leg 330 provides another output terminal of the auxiliary converter 324. The auxiliary voltage Vaux of the auxiliary converter 324 is generated across these output terminals of the auxiliary converter.

In one embodiment, the auxiliary voltage has a characteristic of a resonant capacitor voltage. In other words, the auxiliary converter 324 is controlled such that it would produce a similar voltage as that would have been produced by a resonant capacitor. In one embodiment, the auxiliary converter 324 is controlled such that the auxiliary voltage Vaux lags an output current I1ac of the first converter 302 by 90 degrees as this will corresponds to a voltage generated by a resonant capacitor. In order to control the auxiliary converter 324 so as to generate the auxiliary voltage, switching pulses of auxiliary converter 324 may be phase shifted by 90 degrees with respect to switching pulses of first converter 302 as the voltage V1ac is generally in phase with current I1ac.

Further, when the phase angle of the auxiliary converter 324 is at 90 degrees to the phase angle of the main converters 302 and 304 and the turns ratio of transformer 306 is 1:1, the converter 300 is supposed to have a unity gain, i.e., first bus voltage V1 is substantially equal to second bus voltage V2. Thus, in one embodiment of the present technique, the auxiliary voltage Vaux is controlled to be equal in magnitude to and opposite in phase of a voltage drop across first resonant inductor 312. Thus, the overall voltage drop across the resonant circuit 305 then becomes zero and the converter 300 operates at unity voltage gain. Further, in one embodiment, where the converter 300 needs to be operated at a non-unity gain, the voltage drop across resonant circuit 305 is varied by changing the phase shift of the auxiliary voltage Vaux, i.e., the auxiliary voltage Vaux instead of lagging the voltage V1ac by 90 degrees may lag or lead it by a different phase shift angle. This results in the capacitor 326 to be charged at higher or lower voltage which further results in varying the magnitude of the auxiliary voltage Vaux. It should be noted that by varying the phase shift of Vaux with respect to V1ac, the resonant circuit 305 can be made to operate in a capacitive or inductive region. Thus, auxiliary converter 324 provides an additional flexibility to operate the converter 300 in different modes.

It should be noted that capacitor 326 of auxiliary converter need not be a special resonant capacitor as in converter 200 but may be a regular capacitor. The reason for not needing the special resonant capacitor is that even if the value of the capacitor 326 varies significantly, it does not affect the soft switching of converter 300 as the auxiliary voltage does not depend on the value of capacitor 326, but rather on the phase shift of Vaux and the magnitude of the current I1ac.

In operation, first converter 302 acts as a DC to high frequency AC converter and second converter 304 acts as a high frequency AC to DC converter. In this case, first converter 302 converts input DC voltage V1 into medium/high frequency AC voltage V1ac and second converter 304 converts medium/high frequency AC voltage V2ac into output DC voltage V2. Further, the resonant circuit 305 provides soft switching of switching devices as explained earlier. In one embodiment, diodes D1, D2, D3 and D4 of diode bridge converter 218 may be replaced with switching devices when the power need to be transferred from the second bus to the first bus. This allows bidirectional power flow between the first bus and the second bus.

Further, in case of a fault on second converter 304, capacitor 326 may be bypassed by switching on either the top or bottom switching devices of legs 328 and 330. This way the fault current does not go through the capacitor 326 but rather the switching devices, which is not possible with respect to converter 200.

Figure 4:
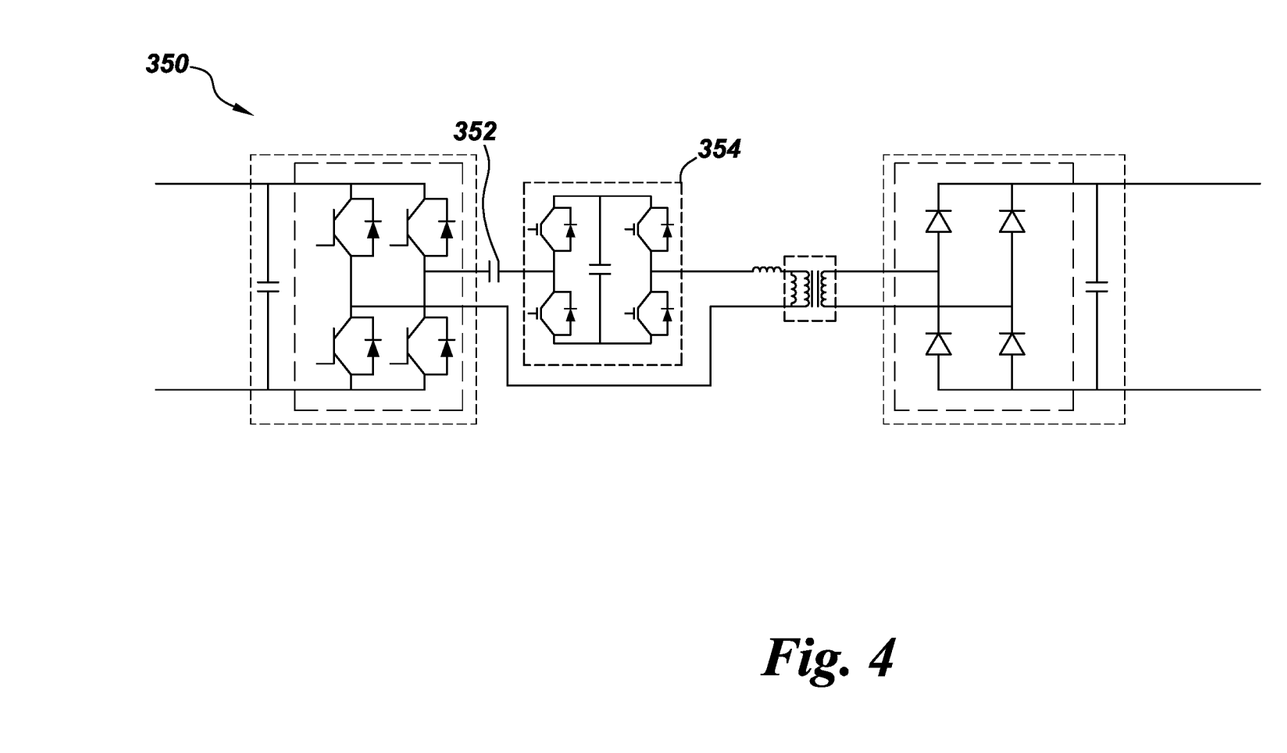
FIG. 4 is a schematic representation of another embodiment of a resonant DC to DC power converter, according to aspects of the present disclosure.

FIG. 4 shows a schematic diagram of a resonant DC to DC power converter 350 in accordance with another embodiment of the present technique. Resonant power converter 350 includes a resonant capacitor 352 along with an auxiliary converter 354, wherein the resonant capacitor 352 and the auxiliary converter 354 are connected in series. This embodiment provides even more flexibility with respect to control of the resonance condition in power converter 350 as compared to power converter 300 of FIG. 3.

Figure 5:
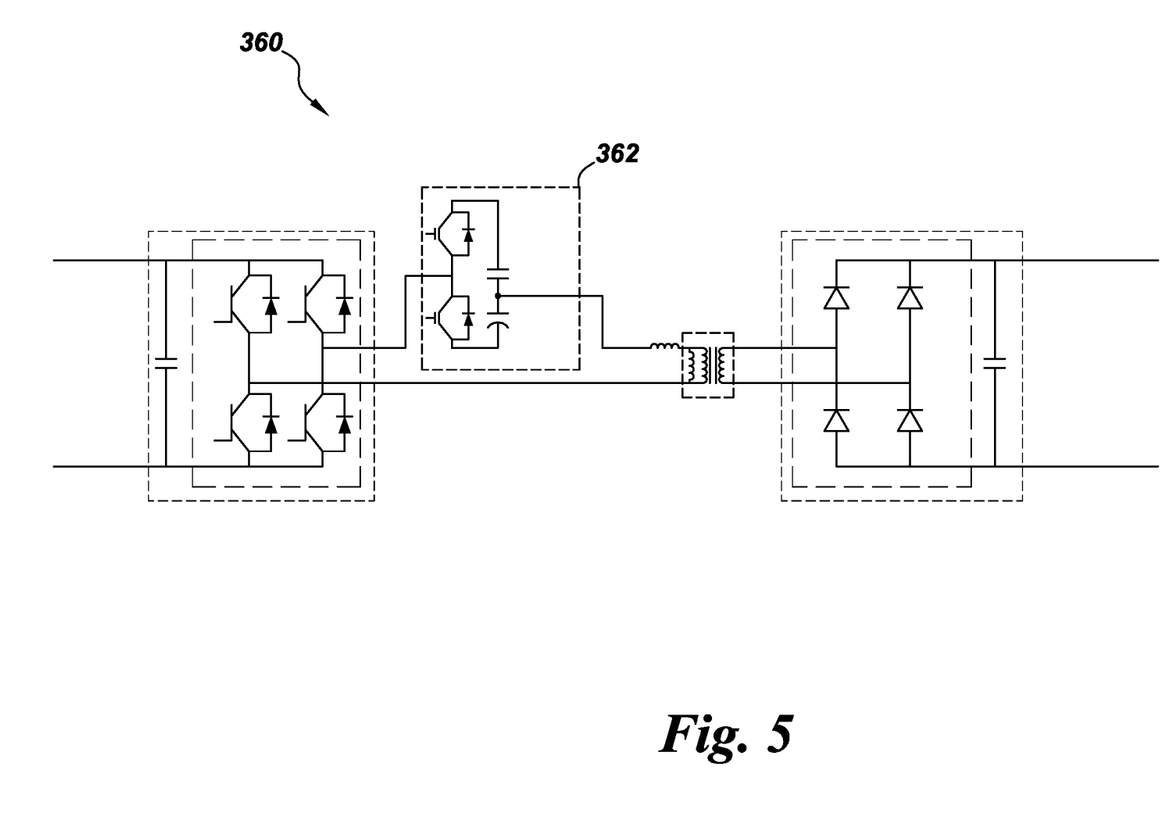
FIG. 5 is a schematic representation of yet another embodiment of a resonant DC to DC power converter, according to aspects of the present disclosure.

FIG. 5 shows a schematic diagram of a resonant DC to DC power converter 360 in accordance with yet another embodiment of the present technique. Resonant power converter 360 includes an auxiliary converter 362 which includes a half bridge converter. This embodiment provides lesser flexibility with respect to control of the power converter 360 as compared to power converter 300. However, power converter 360 includes less number of components as compared to power converter 300.

Figure 6:
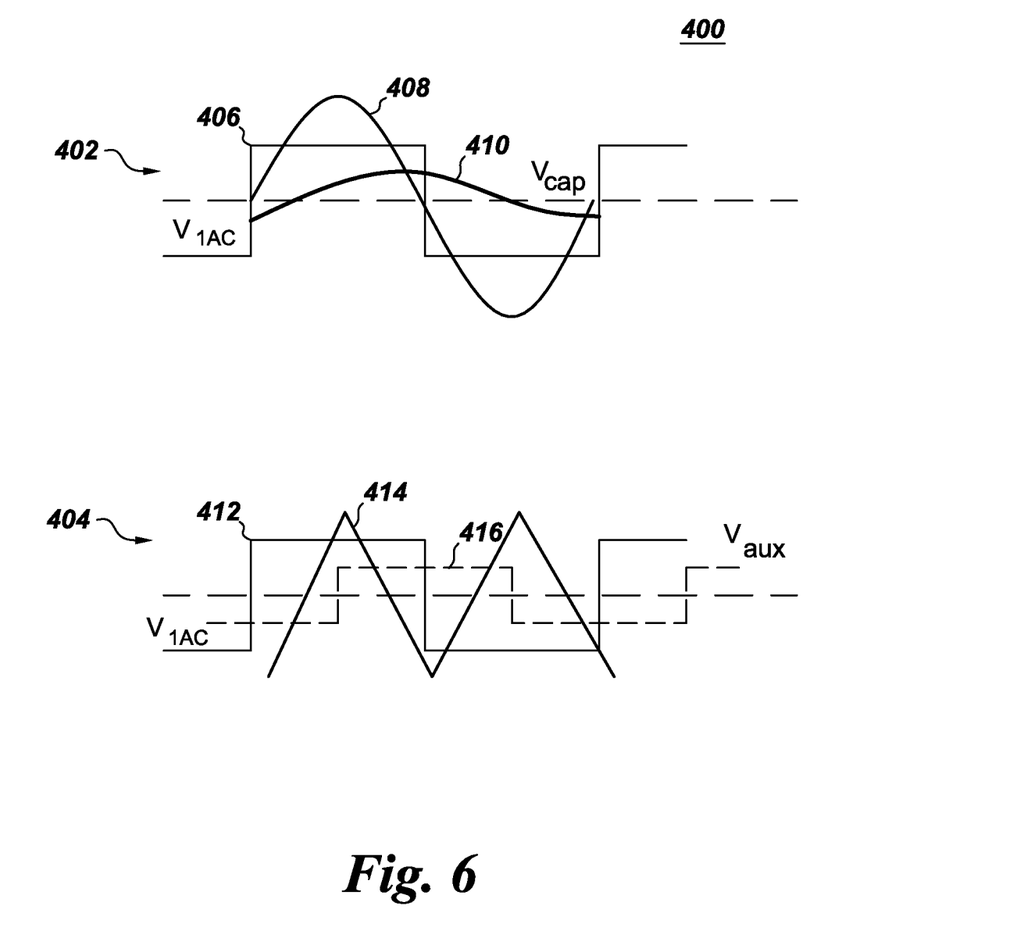
FIG. 6 is a graphical representation of simulation waveforms of power converters of FIGS. 2 and 3.

FIG. 6 shows a graphical representation 400 of simulation waveforms of power converters of FIGS. 2 and 3. In FIG. 6, graphical plots 402 and 404 show simulation waveforms of DC to DC converters 200 and 300 respectively. In graphical plot 402, a waveform 406 corresponds to the voltage V1ac produced by the first converter 202. Further, in graphical plot 402, a waveform 408 corresponds to a capacitor current Icap in resonant capacitor 208 and a waveform 410 corresponds to a capacitor voltage Vcap across resonant capacitor 208. As discussed earlier, the voltage Vcap gets added to the output voltage of the first converter 202. Similarly, in graphical plot 404, a waveform 412 corresponds to the voltage V1ac produced by the first converter 302. Further, a waveform 414 corresponds to a current Iaux at the auxiliary converter 324 terminals and a waveform 416 corresponds to an auxiliary voltage Vaux generated by auxiliary converter 324 which gets added to the output voltage of the first converter 302.

As can be seen from plots 402 and 404, the capacitor voltage of converter 200 has a substantially sinusoidal waveform whereas the auxiliary voltage of converter 300 has a substantially square waveform. It should be noted that the capacitor voltage Vcap of capacitor 326 in converter 300 would be a substantially constant voltage waveform and the square auxiliary voltage waveform is generated by switching appropriate switching devices in the auxiliary converter 324. The capacitor voltage Vcap is maintained at an appropriate level by phase shifting Vaux with respect to V1ac which results in charging or discharging of capacitor 326. An electrical source or load can be optionally connected in parallel to capacitor 326, Further, it can be seen that although the auxiliary voltage Vaux is a square voltage waveform, the phase angle of the auxiliary voltage Vaux with respect to the first converter voltage V1ac is same as the phase angle of the capacitor voltage Vcap of DC to DC converter 200 with respect to its first converter voltage V1ac. Thus, the overall soft-switching operation of both DC to DC converters remains similar. Moreover, it should be noted that the capacitor current in converter 200 has a sinusoidal waveform but the current in auxiliary converter 324 has a triangular waveform. It should also be noted that although auxiliary converter terminal voltage Vaux is shown as a square waveform with 50% duty cycle, other waveforms with varying duty cycles can be used. By varying the duty cycle of Vaux, the current waveform 414 can be changed from a triangular waveform to, for example, a trapezoidal waveform.

Figure 7:
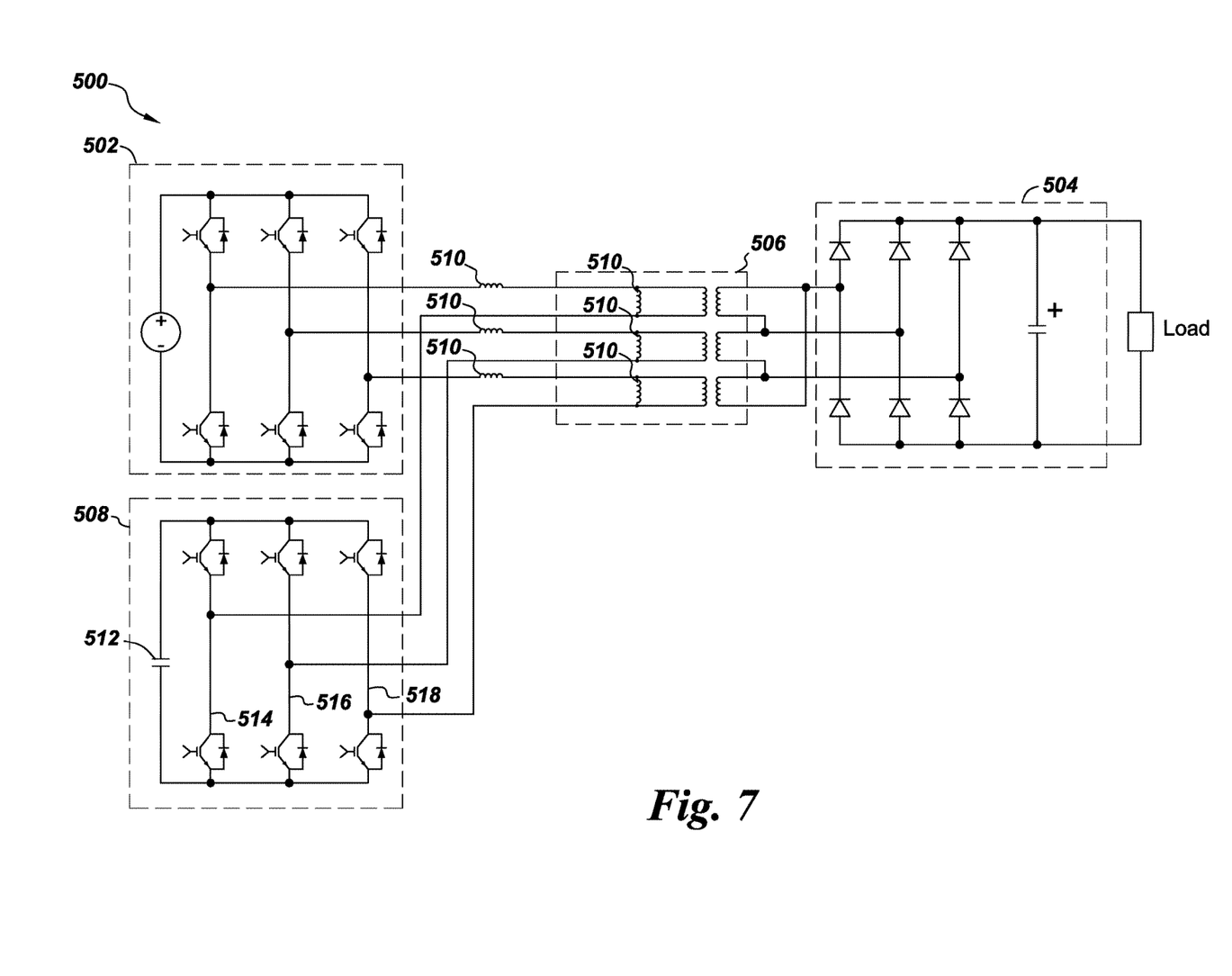
FIG. 7 is a schematic representation of a three-phase resonant DC to DC power converter, according to aspects of the present disclosure.

FIG. 7 shows a schematic representation of a three-phase resonant DC to DC power converter 500 in accordance with an embodiment of the present technique. As compared to DC to DC converter 300 of FIG. 3, DC to DC converter 500 utilizes three phase converters for a first converter 502 and a second converter 504. The first converter 502 converts the DC voltage of the first bus into a three phase high frequency AC voltage and the second converter 504 converts the three phase high frequency AC voltage into the DC voltage of the second bus. Further, DC to DC converter 500 includes a three phase high frequency transformer 506 which couples the first converter 502 and second converter 504. Moreover, in each phase winding of transformer 506 a resonant inductor 510 is placed in series. The resonant inductor can be constituted by the leakage inductance of the transformer. In addition an inductor 511 is provided in parallel to the transformer windings and can be constituted by the transformer magnetizing inductance. The three phase resonant DC to DC power converter 500 also includes an auxiliary converter 508 in a similar manner to the DC to DC power converter 300. The auxiliary converter 508 is a three phase converter which converts a DC voltage into a three phase high frequency AC voltage. The auxiliary converter 508 includes a capacitor 512 and three legs 514, 516, 518, each leg including two switching devices connected in series. The mid-points of the two switching devices of all three legs provide output terminal of the auxiliary converter 508 where the three phase high frequency AC voltage of the auxiliary converter 508 is generated. The output terminals of the auxiliary converter 508 are connected to three phase primary windings of transformer 506. Thus, the voltage applied across the windings of transformer 506 is the vector summation of the voltages produced by first converter 502 and auxiliary converter 508.

It should be noted that current ripple in capacitor 512 of three-phase resonant DC to DC power converter 500 is much lower compared to power converter 300 because the three legs 514, 516, 518 substantially cancel out most of the ripple current. Further, since only one capacitor is being used for all three phases, the losses in DC to DC power converter 500 will be further reduced compared to an embodiment where three resonant capacitors may be used. Moreover, the capacitor 512 need not be a special resonant capacitor as discussed earlier and therefore the overall cost of the resonant capacitors is significantly reduced. In addition the auxiliary converter switches can have lower losses than those typically encountered in the equivalent series resistance (ESR) of resonant capacitors. Thus, employing an auxiliary converter in place of the resonant capacitors results in cost saving as well as space saving and it also increases reliability and control flexibility of the power converter. While the auxiliary converter has been shown on the primary side of the transformers, it could be placed on the secondary side or split between the two sides to achieve the discussed functionality and advantages.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A direct current (DC) to DC power converter, comprising:
   a first converter for converting a first DC bus voltage into a first high frequency alternating current (AC) voltage;
   a second converter for converting a second high frequency AC voltage into a second DC bus voltage;
   a resonant circuit for coupling the first convener and the second converter, wherein the resonant circuit comprises:
      a high frequency transformer coupled between the first converter and the second converter;
      an auxiliary converter coupled in series with a first resonant inductor and the high frequency transformer, wherein an auxiliary voltage generated by the auxiliary converter is added in series with an output voltage of the first converter;
      a second resonant inductor coupled across a first winding of the high frequency transformer;
   a controller for providing switching signals to the first converter, and the second converter and the auxiliary converter to operate the power converter in a soft switching mode,
   wherein the controller controls the auxiliary voltage generated by the auxiliary converter to have a characteristics of a resonant capacitor voltage; and
   wherein the controller controls the auxiliary converter such that the auxiliary voltage is equal in fundamental frequency magnitude and opposite in phase of a voltage drop across the first resonant inductor.

2. The power converter of claim 1, wherein the controller controls the auxiliary converter such that the voltage across the auxiliary converter lags the current through the auxiliary converter.

3. The power converter of claim 1, wherein the first converter and the second converter each include a full bridge or half-bridge converter having a plurality of switching devices.

4. The power converter of claim 3, wherein the plurality of switching devices includes silicon carbide devices.

5. The power converter of claim 1, wherein the second bus converter includes a diode bridge converter.

6. The power converter of claim 1, wherein the auxiliary converter includes a full bridge converter or a half bridge converter.

7. The power converter of claim 1 further comprising a resonant capacitor connected in series with the auxiliary converter and wherein the auxiliary converter includes a capacitor connected in parallel with at least two legs, each leg having at least switching devices connected in series.

8. The power converter of claim 1, wherein the controller controls the auxiliary converter such that switching pulses of the auxiliary converter are phase shifted with respect to switching pulses of the first converter.

9. The power converter of claim 1, wherein the first high frequency AC voltage and second high frequency AC voltage include single phase voltage.

10. The power converter of claim 9, wherein terminals of a series connection formed by the auxiliary converter and the first resonant inductor are connected between one output terminal of the first converter and one input terminal of the high frequency transformer.

11. The power converter of claim 1, wherein the first high frequency AC voltage and second high frequency AC voltage are three phase voltages.

12. The power converter of claim 11, wherein the first converter includes DC to three phase AC converter and the second converter includes three phase AC to DC converter.

13. The power converter of claim 12, wherein the auxiliary converter includes a DC to three phase AC converter and the high frequency transformer includes a three phase high frequency transformer.

14. The power converter of claim 13, wherein terminals of the DC to three phase AC converter are connected to primary windings of the three phase high frequency transformer.

15. The power converter of claim 1, wherein the first resonant inductor includes leakage inductance of the high frequency transformer and the second resonant inductor includes magnetizing inductance of the high frequency transformer.

16. The power converter of claim 1, wherein the auxiliary voltage generated by the auxiliary converter has a substantially square waveform.

17. A method of transmitting DC power from a first DC bus to a second DC bus, the method comprising:
   providing a first convener for converting a first DC bus voltage into a first high frequency alternating current (AC) voltage;
   providing a second converter for converting a second high frequency AC voltage into a second DC bus voltage;
   coupling a resonant circuit to the first convener and the second converter for converting the first high frequency AC voltage into a second high frequency AC voltage, wherein the resonant circuit comprises:
      a high frequency transformer coupled between the first converter and the second converter;
      an auxiliary converter coupled in series with a first resonant inductor and the high frequency transformer, wherein an auxiliary voltage generated by the auxiliary convener is added in series with an output voltage of the first convener;
      a second resonant inductor coupled across a first winding of the high frequency transformer;
   controlling the auxiliary convener to generate soft switching waveforms for switching devices of the first converter and the second converter;
   wherein the auxiliary voltage is controlled to have a characteristics of a resonant capacitor voltage; and
   wherein the first converter includes DC to three phase AC converter and the second converter includes three phase AC to DC converter.

18. The method of claim 17, wherein controlling the auxiliary converter comprises generating an auxiliary voltage that lags a current through the auxiliary converter.

19. The method of claim 17, wherein controlling the auxiliary converter comprises generating an auxiliary voltage which is equal in fundamental magnitude to and opposite in phase of a voltage drop across the first resonant inductor.

20. The. method of claim 17, wherein the switching devices of the first converter and the second converter include silicon carbide devices.

21. The method of claim 17, wherein coupling the resonant circuit includes connecting terminals of a series connection formed by the auxiliary converter and the first resonant inductor between one output terminal of the first converter and one input terminal of the high frequency transformer.

22. The method of claim 21, wherein the auxiliary converter includes a DC to three phase AC converter and the high frequency transformer includes a three phase high frequency transformer.

23. The method of claim 22, wherein coupling the resonant circuit includes connecting terminals of the DC to three phase AC converter to primary windings of the three phase high frequency transformer.

24. The method of claim 17 further comprising bypassing a capacitor of the auxiliary converter in case of a fault.

25. A method of transmitting DC power from a first DC bus to a second DC bus, the method comprising:
    providing a first converter for converting a first DC bus voltage into a first high frequency alternating current (AC) voltage;
    providing a second converter for converting a second high frequency AC voltage into a second DC bus voltage;
    coupling a resonant circuit to the first converter and the second converter for converting the first high frequency AC voltage into a second high frequency AC voltage, wherein the resonant circuit comprises:
        a high frequency transformer coupled between the first converter and the second converter;
        an auxiliary converter coupled in series with a first resonant inductor and the high frequency transformer, wherein an auxiliary voltage generated by the auxiliary converter is added in series with an output voltage of the first converter;
        a second resonant inductor coupled across a first winding of the high frequency transformer;
    controlling the auxiliary converter to generate soft switching waveforms for switching devices of the first converter and the second converter;
    bypassing a capacitor of the auxiliary converter in case of a fault; and
    wherein the auxiliary voltage is controlled to have a characteristics of a resonant capacitor voltage.

* * * * *